United States Patent
Billau et al.

(10) Patent No.: US 10,620,718 B2
(45) Date of Patent: Apr. 14, 2020

(54) DEVICE SELECTION IN THREE-DIMENSIONAL ENVIRONMENTS

(71) Applicant: International Business Machines Corporation, Armonk, NY (US)

(72) Inventors: Michael R. Billau, Durham, NC (US); John K. Gerken, III, Apex, NC (US); Jeremy A. Greenberger, Raleigh, NC (US); Ciaran E. Hannigan, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 124 days.

(21) Appl. No.: 15/193,445

(22) Filed: Jun. 27, 2016

(65) Prior Publication Data

US 2017/0371427 A1    Dec. 28, 2017

(51) Int. Cl.
*G06F 3/0346* (2013.01)

(52) U.S. Cl.
CPC .................. *G06F 3/0346* (2013.01)

(58) Field of Classification Search
CPC ............... G06F 3/0304; G06F 3/0346; H04N 21/42204
See application file for complete search history.

(56) References Cited

U.S. PATENT DOCUMENTS

| | | |
|---|---|---|
| 8,352,639 B2 | 1/2013 | Dods et al. |
| 8,638,222 B2 | 1/2014 | Soldan et al. |
| 8,797,265 B2 | 8/2014 | Silvester |
| 8,963,694 B2 | 2/2015 | Nystrom et al. |
| 2005/0071879 A1 | 3/2005 | Haldavnekar et al. |
| 2009/0052899 A1 | 2/2009 | Mok et al. |
| 2010/0085275 A1 | 4/2010 | Inami et al. |
| 2011/0291971 A1 | 12/2011 | Masaki et al. |
| 2012/0135692 A1 | 5/2012 | Feri et al. |
| 2013/0113993 A1 | 5/2013 | Dagit, III |
| 2014/0129937 A1* | 5/2014 | Jarvinen ............... G06F 3/0487 715/716 |
| 2015/0008845 A1 | 1/2015 | Kim et al. |
| 2015/0347114 A1 | 12/2015 | Yoon |
| 2018/0151060 A1* | 5/2018 | Griffin .................. G08C 17/00 |

OTHER PUBLICATIONS

Lopex-De-Ipina et al., "A Platform to Build Smart Spaces Controllable From Moble Devices", University of Deusto, Spain, pp. 31-40, retrieved on Feb. 22, 2016.
Lunardi et al., "Context-based Search Engine for Industrial IoT: Discovery, Search, Selection, and Usage of Devices", 8 pages, 978-1-4673-7929-8/15, © 2015 IEEE.
"Accurate RTLS indoor tracking and tracing", Blinksight, product brochure, Jan. 6, 2016, 2 pages, retrieved on Apr. 11, 2016, <http://www.blinksight.com/wp-content/uploads/2013/04/Blinksight%20Brochure%2016.pdf>.
"Blinksight's Indooe Location Technology", Vimeo, 3 pages, printed on Apr. 8, 2016, <https://vimeo.com/109122041>.
"Smart Home", Amazon, 7 pages, printed on Apr. 8, 2016, <http://www.amazon.com/home-automation-smarthome/b?ie=UTF8&node=6563140011>.

* cited by examiner

*Primary Examiner* — Priyank J Shah
(74) *Attorney, Agent, or Firm* — Michael A. Petrocelli (57) ABSTRACT

A computer-implemented method includes comprises identifying a pointer device associated with a pointer position identifier and a pointer direction identifier. The computer-implemented method further includes identifying a target device associated with a target position indicator and determining whether, within a tolerance margin, the pointer devices points at the target device. A corresponding computer program product and computer system are also disclosed.

14 Claims, 5 Drawing Sheets

| Pointer Position 221 | Pointer Direction 231 | Pointer-Based Ray 451 |
|---|---|---|
| $(X_{pp}, Y_{pp}, Z_{pp})$ | $(X_{pd}, Y_{pd}, Z_{pd})$ | $(X_{pp}, Y_{pp}, Z_{pp}) +$ [Length_Factor * $(X_{pd}, Y_{pd}, Z_{pd})$] |

DEVICE SELECTION IN THREE-DIMENSIONAL ENVIRONMENTS

BACKGROUND

The present invention relates generally to the field of device selection solutions, and more particularly to device selection solutions suited for environments modeled as a three-dimensional space.

In environments that can be modeled as a three-dimensional space, selecting devices can be performed based on protocols of determining a geometric association between a pointer device and a target device. Critical to the utility of such protocols is the ease of use, the amount of hardware required on the pointer device and the target device, and the amount of processing required to determine the geometric association between the pointer device and the target device. Existing solutions have problems with one or more of user-friendliness, the need for specialized hardware, or extensive computational power. Developers and users of device selection solution in three-dimensional environments continue to have problems with user friendliness, hardware cost, and computational complexity of such solutions.

SUMMARY

Embodiments of the present invention include a computer-implemented method that includes identifying a pointer device associated with a pointer position identifier and a pointer direction identifier. The computer-implemented method further includes identifying a target device associated with a target position indicator and determining whether, within a tolerance margin, the pointer devices points at the target device. The computer-implemented method enables determining a geometric correlation between a pointer device and a target device based on input data (the determined position and direction of the pointer device and the determined position of the target device) that can be determined without specialized hardware on the target device. A computer program product and computer system corresponding to the computer-implemented are also disclosed.

Embodiments of the present invention also optionally include a computer-implemented method wherein determining whether the pointer device points at the target device further includes determining a pointer-based ray associated with the pointer device based on the pointer position indicator and the pointer direction indicator; determining a pointer-based coverage area based on the pointer-based area and the tolerance margin; and determining whether said target position indicator falls within the pointer-based coverage area. The computer-implemented method enables determining a geometric correlation between a pointer device and a target device based on cost effective calculations that are not computationally complex. A computer program product and computer system corresponding to the computer-implemented are also disclosed.

Embodiments of the present invention also optionally include a computer-implemented method that further includes receiving one or more user position tracking data artefacts from the pointer device and receiving one or more user object identification data artefacts associated with the one or more user position tracking data artefacts from the pointer device. Identifying the target device is performed based on the one or more user object identification data artefacts and the target position indicator is determined based on the one or more user position tracking data artefacts. The computer-implemented method enables identifying a target device and a target position indicator in a user-friendly manner by moving the pointer device. A computer program product and computer system corresponding to the computer-implemented are also disclosed.

DETAILED DESCRIPTION

Embodiments of the present invention address the problem of device selection in three-dimensional environments in a manner that is user friendly, has little hardware requirements, and is not computationally complex. An ideal device selection solution for a three-dimensional environment would require minimal work on behalf of users in identifying the position of target devices, minimal special hardware infrastructure on pointer and target devices, and would involve minimal computations for determining a geometric correlation between the pointer device and the target device. Embodiments of the present invention address that problem at least in the following four ways: (i) by allowing users to define the positioning of the target device through moving the pointer device in space; (ii) by requiring no input from the target device in determining the position of the target device; (iii) by requiring no transmission of signals from the pointer device and/or to the target device; and (iv) by determining a geometric correlation between the pointer and the target device through cost effective calculations based on the determined position and direction of the pointer device and the determined position of the target device.

Aspects of the present invention have the advantage of allowing user to define the positioning of the target device through moving the pointer device in space, thus improving over solutions that require complex data configuration and/or data gathering operations to determine the positioning of the target device. Aspects of the present invention have the advantage of requiring no input from the target device in determining the position of the target device, thus improving over solutions that require complex sensors and/or other data gathering mechanisms on target devices. Aspects of the present invention have the advantage of requiring no transmission of signals from the pointer device and/or to the target device, thus improving over solutions that require such transmissions and the hardware and software capabilities requires for successful transmission and processing of signals. Aspects of the present invention have the advantage of determining a geometric correlation between the pointer and the target device through cost effective calculations based on the determined position and direction of the pointer device and the determined position of the target device, thus improving solutions that require other complex mathematical modeling and/or calculation tasks to accomplish device selection in three-dimensional environments. Nevertheless, the aforementioned advantages are not required to be present in all of the embodiments of the invention and may not be present in all of the embodiments of the invention.

Figure 1:
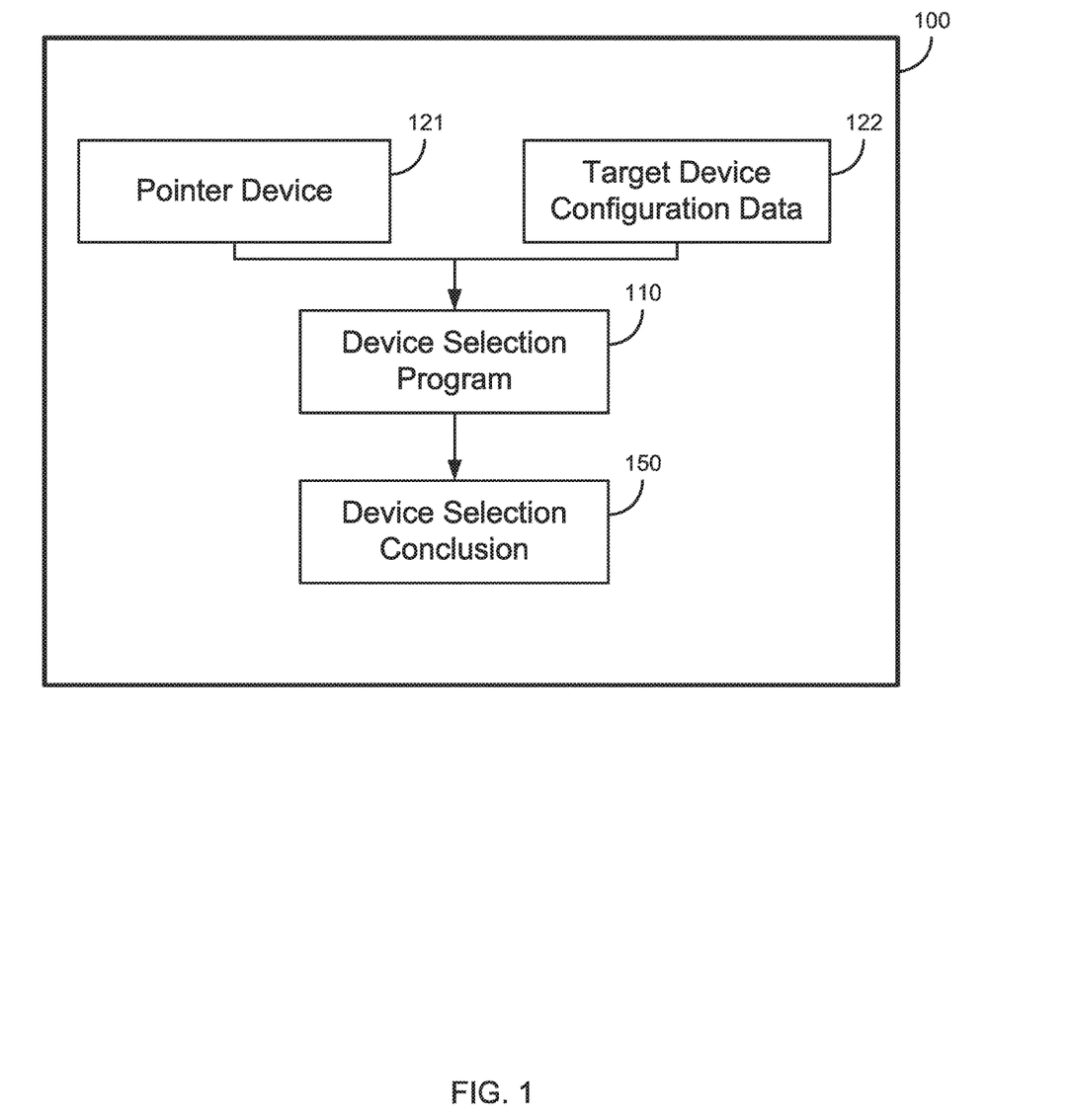
FIG. 1 is a block diagram of one embodiment of a computer system environment suitable for operation of a device selection program, in accordance with at least one embodiment of the present invention.

FIG. 1 is a block diagram of a computer system environment 100 suitable for operating a device selection program 110, in accordance with at least one embodiment of the present invention. In the computer system environment 100 depicted in FIG. 1, a pointer device 121 is any computing device that receives one or more target selection input data artefacts from at least one user, wherein the one or more target selection input data artefacts provide at least one information artefact to the program 110 that can be used to determine, select, and/or designate one or more other devices (i.e., the one or more target devices) based on positioning and/or direction of the pointer device 121 and the one or more target devices (i.e., whether the pointer device 121 "points at" the target device). In some embodiments, the user interacts directly with the pointer device 121, while in some other embodiments the pointer device receives at least one of the one or more target selection input data artefacts from at least one intermediary device and/or determines at least one of the one or more target selection input data artefacts based on one or more data artefacts from at least one sensor device accessible to the pointer device 121. In some embodiments, a device is considered to be "pointing at" another device if the two devices are determined to be in a pre-defined geometric relationship with each other (e.g., you can draw a straight line from one device to the other, where the straight line starts from the first device and moves in the direction of the first device), wherein the geometric relationship is defined based on the recognized position and/or direction of at least one of the two devices.

In the computer system environment 100 depicted in FIG. 1, a target device configuration data artefact 122 is any data artefact that, in whole or in part and directly or when interpreted in combination with one or more other data artefacts, provides at least one information artefact about at least one property (e.g., geometric positioning in a coordinate space, direction, etc.) associated with a target device. In at least some embodiments, a target device is any device that can, during normal and non-exceptional executions, be pointed at by the pointer device 121.

In the computer system environment 100 depicted in FIG. 1, the device selection program 110 uses information artefacts provided by the pointer device 121 and the target device configuration data 122 to determine one or more device selection conclusions 150. In at least some embodiments, a device selection conclusion is any combination of one or more data artefacts that indicates, in whole or in part and directly or when interpreted in combination with one or more other data artefacts, whether the pointer device 121 points at least one of the one or more target devices (e.g., within a tolerance margin). In at least some embodiments, the pointer device 121 points at a target device when the pointer device 121 determines, selects, and/or designates the target device based on positioning and/or direction of the pointer device 121 and target device.

Figure 2:
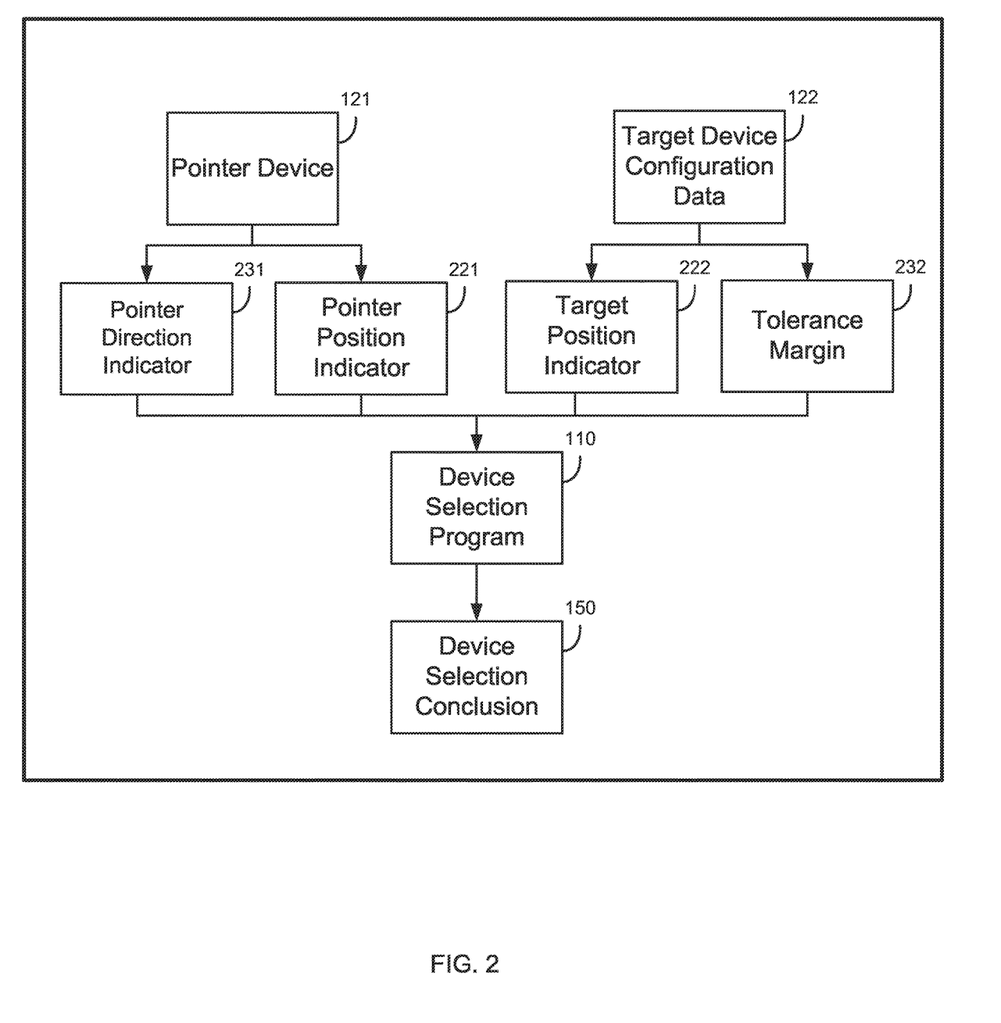
FIG. 2 is a flowchart diagram of a device selection program, in accordance with at least one embodiment of the present invention.

FIG. 2 is a data-flow diagram of a device selection program 110, in accordance with at least one embodiment of the present invention. In the embodiment depicted in FIG. 2, the program 110 receives a pointer position indicator 221 and a position direction indicator 231 from the pointer device 121. In at least some embodiments, the pointer position indicator 221 associated with the pointer device 121 is any combination of one or more data artefacts that, in whole or in part and directly or when interpreted in combination with one or more other data artefacts, indicate and/or approximate the position of the pointer device 121 in a coordinate space (e.g., a three-dimensional coordinate space, such as a Cartesian three-dimensional space or a polar three-dimensional space). In at least some embodiments, the pointer direction indicator 231 associated with the pointer device 121 is any combination of one or more data artefacts that, in whole or in part and directly or when interpreted in combination with one or more other data artefacts, indicate and/or approximate the direction of the pointer device 121 in a coordinate space (e.g., a three-dimensional coordinate space, for instance through the characterization of the direction as a three-dimensional vector).

In the embodiment depicted in FIG. 2, the device selection program 110 receives a target position indicator 222 and a tolerance margin 232 from the target device configuration data 122. In at least some embodiments, a target position indicator 222 associated with a target device is any combination of one or more data artefacts that, in whole or in part and directly or when interpreted in combination with one or more other data artefacts, indicate and/or approximate the position of the target device in a coordinate space (e.g., a three-dimensional coordinate space). In at least some embodiments, a tolerance margin 232 associated with the target device is any combination of one or more data artefacts that indicate the amount, degree, and/or level of allowed misalignment between a calculated geometric reach of the pointer device 121 (determined based on the pointer position indicator 221 and the position direction indicator 231 associated with the pointer device 121) and the target position indicator 222. In some embodiments, the tolerance margin 232 may be equal to zero, in which case no amount of misalignment between the calculated geometric reach of the pointer device 121 and the target position indicator 222 is allowed by the program 110.

In the embodiment depicted in FIG. 2, the device selection program 110 uses the pointer position indicator 221 and the position direction indicator 231 associated with the pointer device 121 (e.g., to determine a geometric reach of the pointer device 121, for instance using a three-dimensional ray from the pointer position indicator 221 and with the same magnitude and direction as the vector characterizing the pointer direction indicator 231) as well as the target position indicator 222 (e.g., to identify and/or determine a position of the target device). The program 110 also uses the tolerance margin to determine whether the determined geometric reach of the pointer device 121 captures the target device by a degree of misalignment less than or equal to the tolerance margin 232 (e.g., whether the pointer-based ray identified above crosses the target device or a point within the tolerance margin 232 of the target device). The program 110 determines a device selection conclusion 150 based on those inputs. In at least some embodiments, the program 110 determines that the pointer device 121 points at the target device if the pointer-based ray from the pointer position indicator 221 and with the same magnitude and direction as the vector characterizing the pointer direction indicator 231 crosses the target device or a point within the tolerance margin 232 of the target device.

Figure 3:
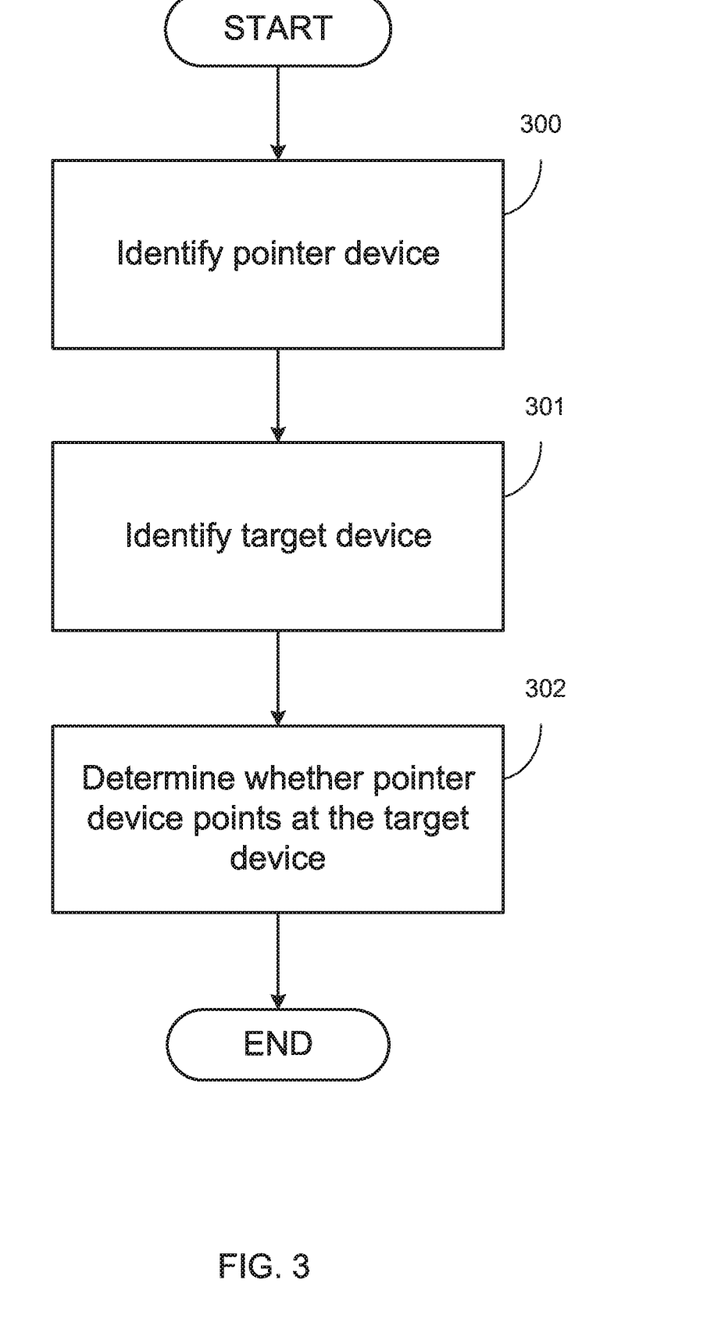
FIG. 3 is an operational example of a device selection program, in accordance with at least one embodiment of the present invention.

FIG. 3 is a flow-chart diagram of a device selection program, in accordance with at least one embodiment of the present invention. At step 300, the program identifies a pointer device associated with a pointer position indicator and a pointer direction indicator. At step 301, the program identifies a target device associated with a target position indicator. At step 302, the program determines whether, within a tolerance margin, the pointer device points at the target device.

The device selection program identifies a pointer device at step 300. In some embodiments, the program identifies the pointer device and/or one or more properties associated with the pointer device (e.g., the pointer position indicator and/or the pointer direction indicator) using one or more pre-existing data, such as one or more pointer device configuration data artefacts. In some embodiments, the program identifies the pointer device and/or one or more properties associated with the pointer device (e.g., the pointer position indicator and/or the pointer direction indicator) by communicating with one or more devices (e.g., the pointer device and/or one or more sensor devices associated with the pointer device) over at least one network. In some embodiments, the pointer device is a phone device, such as a smartphone device.

In some embodiments, the device selection program identifies one or more gyroscope data artefacts associated with the pointer device and the pointer direction indicator is determined based on the one or more gyroscope data artefacts. In at least some embodiments, a gyroscope data artefact is any data artefact that, in whole or in part and directly or when interpreted in combination with one or more other data artefacts, provides and/or indicates at least one information artefact about the rotation and/or twist of the pointer device (such as a smartphone pointer device) in at least one time.

The device selection program identifies a target device at step 301. In some embodiments, the program identifies the target device and/or one or more properties associated with the target device (e.g., the target position indicator) using one or more pre-existing data, such as one or more target device configuration data artefacts. In some embodiments, the program the target device and/or one or more properties associated with the target device (e.g., the target position indicator) by communicating with one or more devices (e.g., the target device and/or one or more sensor devices associated with the target device) over at least one network.

In some embodiments, the device selection program further comprises receiving one or more user position tracking data artefacts from the pointer device and receiving one or more user object identification data artefacts associated with the one or more user position tracking data artefacts from the pointer device. In at least some of those embodiments, identifying the target device is performed based on the one or more user object identification data artefacts and the target position indicator is determined based on the one or more user position tracking data artefacts.

In at least some embodiments, a user position tracking data artefact is a data artefact that, in whole or in part and directly or when interpreted in combination with one or more other data artefacts, provides, approximates and/or indicates the position (e.g., within a geometric coordinate space) of the pointer device and/or a sensor device associated with the pointer device in a time period of at least one time interval (e.g., a period of at least one second). In at least some embodiments, the device selection program receives the one or more user position tracking data artefacts from the pointer device (e.g., which in turn receives input data from a user of the pointer device) and uses the one or more user position tracking data artefacts to determine an area within the space (i.e., a "user-defined target space").

In at least some embodiments, a user object identification data artefact associated with the one or more user position tracking data artefacts is any data artefact that, in whole or in part and directly or when interpreted in combination with one or more other data artefacts, indicates and/or provides that the one or more user position tracking data artefacts are associated with a device (such as a target device). In at least some embodiments, the device selection program receives the one or more user object identification data artefacts associated with the one or more user position tracking data artefacts from the pointer device and uses the one or more user object identification data artefacts to associate the user-defined target space determined based on the one or more user position tracking data artefacts to a device, such as the target device.

In an exemplary embodiment, a user of the pointer device designates an area in the space by moving the pointer device to points in space designating and/or identifying that area. The device selection program receives from the pointer device the user position tracking data artefacts associated with that area and uses those user position tracking data artefacts to recognize and determine that area. The user of the pointer device also indicates that the designated area is associated with a selected device. The program receives from the pointer device the user object identification data artefacts associated with that device selection. In at least some of those embodiments, the program identifies the target device based on the one or more user object identification data artefacts received from the pointer device. In at least some embodiments, the program identifies the target position indicator based on the one or more user object position tracking data artefacts received from the pointer device.

In some embodiments, a target position indicator represents a geometric entity selected from the group consisting of: (i) a point in a three-dimensional space; (ii) a line in a three-dimensional space; (iii) a curve in a three-dimensional space; (iv) a plane in a three-dimensional space; and (v) an object in a three-dimensional space (e.g., a prism, cylinder, cone, sphere, etc.). In some embodiments, pointer position indicator, the pointer direction indicator, and the target position indicator are defined in a three-dimensional space.

The device selection program determines whether, within a tolerance margin, the pointer device points at the target device at step 302. In some embodiments, the program determines whether, within a tolerance margin, the pointer device points at the target device by doing one or more mathematical calculations. In some embodiments, the program determines whether, within a tolerance margin, the pointer device points at the target device by interacting with a third-party mathematical calculation computing component.

In some embodiments, determining whether the pointer devices points at the target device further comprises determining a pointer-based ray associated with the pointer device based on the pointer position indicator and the pointer direction indicator (e.g., through a determining a ray centered at the pointer position indicator and equal in magnitude or direction to a vector characterizing the pointer direction indicator); determining a pointer-based coverage area based on the pointer-based area and the tolerance margin, and determining whether the target position indicator falls within the pointer-based coverage area. In at least some embodiments, a pointer-based coverage area is a combination of one or more data artefacts that, in whole or in part and directly or when interpreted in combination with one or more other data artefacts, provide, indicate, and/or determine a measure of the geometric reach of the pointer device (i.e., identified by the pointer-based ray) as adjusted by the tolerance margin.

Figure 4:
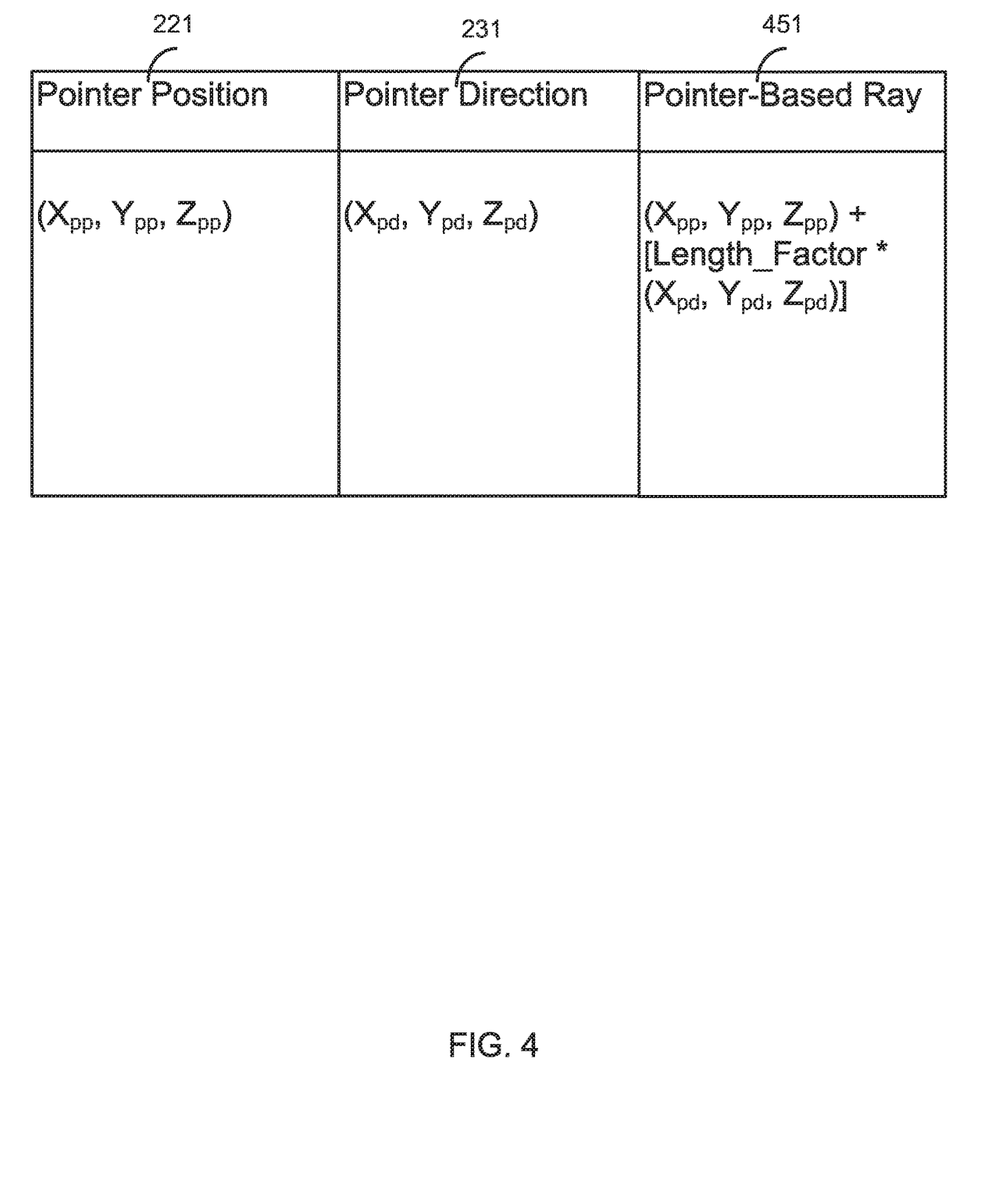
FIG. 4 is an operational example of a pointer-based ray determination, in accordance with at least one embodiment of the present invention.

FIG. 4 is an operational example of a pointer-based ray determination, in accordance with at least one embodiment of the present invention. In the embodiment depicted in FIG. 4, the pointer position indicator 221 is identified by the geometric coordinate position (Xpp, Ypp, Zpp) and the pointer direction indicator 231 is identified by the geometric coordinate vector characterized by a movement of (Xpd, Ypd, Zpd) in the geometric coordinate system. The pointer-based ray 451 determined based on the pointer position indicator 221 and the pointer direction indicator 231 is determined based on the pointer-vector equation of the line and is equal to (Xpp, Ypp, Zpp)+[Length_Factor*(Xpd, Ypd, Zpd)], wherein the Length_Factor is a measure of the length of the pointer-based ray 451. In other embodiments, the pointer-based ray may be determined based on other methods of line calculation, for instance using the parametric form of the equation of a line or the symmetric equations of a line.

A person of ordinary skill in the art will be able to determine the pointer-based ray and the pointer-based coverage area based on the pointer position indicator, the pointer direction indicator, and the tolerance margin. A person of ordinary skill in the art will be able to determine whether the target position indicator falls within the pointer-based coverage area.

In some embodiments, the device selection program identifies one or more target device action indicators associated with the pointer device and the target device. In response to determining that, within the tolerance margin, the pointer device points at the target device, the program determines one or more target device action commands based on each of the one or more target device action indicators. In at least some embodiments, a target device action indicator associated with the pointer device and the target device is any combination of one or more data artefacts that, in whole or in part and directly or when interpreted in combination with one or more other data artefacts, indicate a request for one or more services by the pointer device (e.g., determined based on at least one input data artefact received from at least one user of the pointer device) to the target device.

In at least some embodiments, a target device action command is any combination of one or more data artefacts that, in whole or in part and directly or when interpreted in combination with one or more other data artefacts, indicate a request and/or command for the performance of a particular set of one or more actions from the target device. In at least some embodiments, the device selection program determines the one or more target device action commands based on a sequence of actions that the target device needs to perform to deliver the one or more services requested by the target device action identifiers, wherein the sequence of actions are determined based on the particular architecture, structure, and/or functionalities of the target device. In some embodiments, the one or more target device action indicators are received from the pointer device through at least one computer network. In at least some embodiments, the one or more target device action commands are communicated to the target device through at least one computer network.

In some embodiments, the device selection program is implemented in an environment where more than one potential target devices exist. In an exemplary embodiment, the device identification program is implemented in a room where a television, a lamp, and an air conditioning machine are potential target devices. In some of those embodiments, each potential target device is associated with a priority indicator. If the program determines that the pointer device is pointing at more than one potential target device (e.g., more than one potential target devices fall within the pointer-based coverage area), the program determines that the pointer device is only pointing at the target device with the priority indicator indicating highest priority. In other embodiments, the program prompts the user of the priority device which potential target devices is intended to be selected. The program uses the user selection input to determine which potential target device is being pointed at. In some embodiments, the program allows for communications between more than one pointer device and more than one target device (e.g., to turn off both the lamp and the air conditioning machine in one selection).

In some embodiments, the device selection program resides on the pointer device (e.g., as an application on a smartphone) or on the target device. In other embodiments, the program is implemented on an independent platform that communicates with the pointer device and the target device (e.g., in a cloud computing environment). In some embodiments, the pointer device and/or the target device are thin or "dummy" computing devices and/or non-computing devices that are connected to a processing unit, such as a chip.

In general, one or more steps associated with different embodiments of the device selection program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the device selection program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

Figure 5:
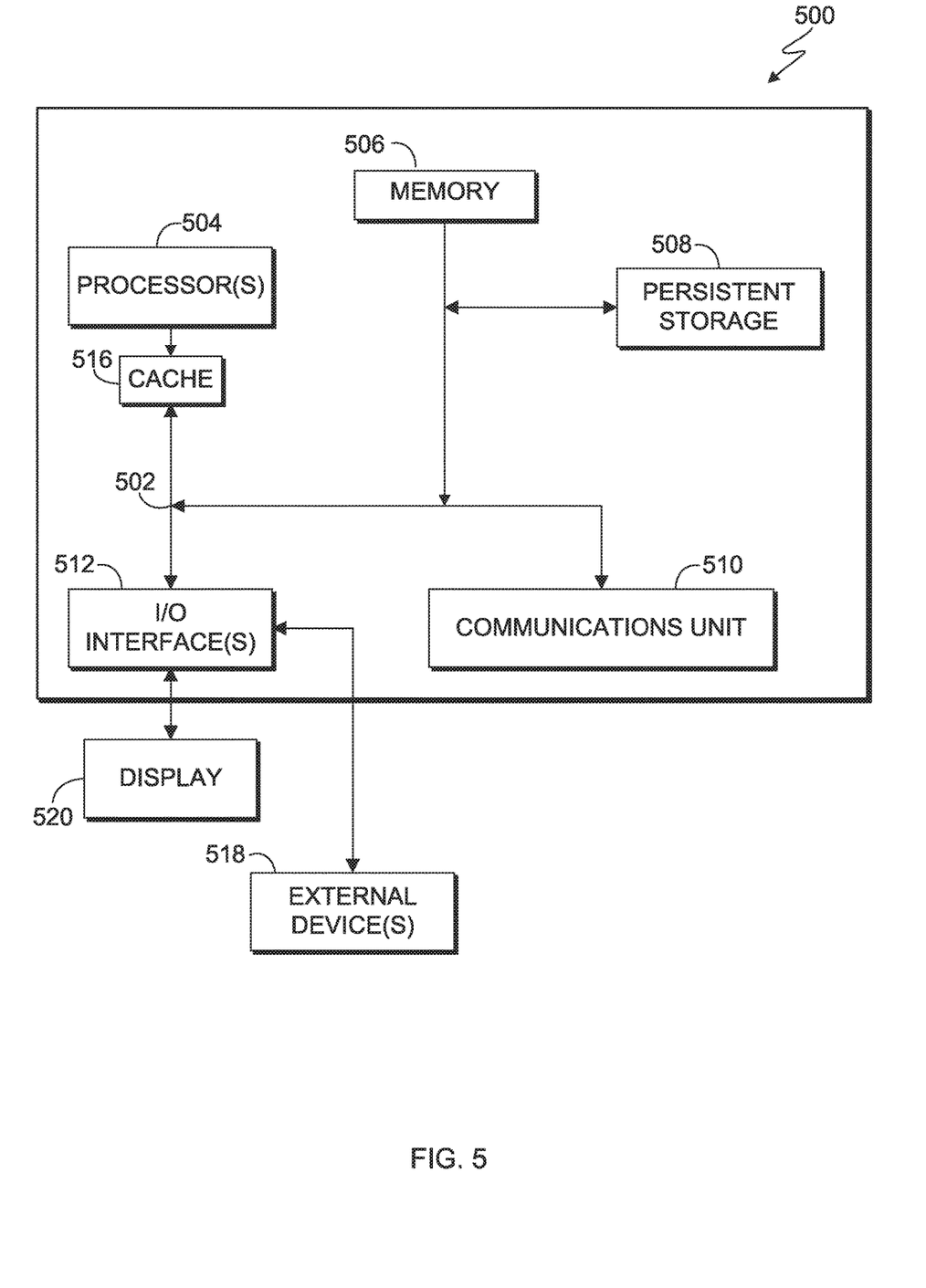
FIG. 5 is a block diagram of a computing apparatus suitable for executing a device selection program, in accordance with at least one embodiment of the present invention.

FIG. 5 is a block diagram depicting components of a computer 500 suitable for executing the device selection program. FIG. 5 displays the computer 500, the one or more processor(s) 504 (including one or more computer processors), the communications fabric 502, the memory 506, the RAM, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the device selection program may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The device selection program may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying a pointer device, said pointer device being associated with a pointer position indicator and a pointer direction indicator;
   determining a pointer-based ray based on said pointer position indicator and said pointer direction indicator, said pointer-based ray being associated with said pointer device;
   determining a point vector originating at said pointer position indicator in a direction of said pointer direction indicator based on said pointer position indicator, said pointer direction indicator, and a length of said pointer-based ray, the pointer vector having a magnitude of said length of said pointer-based ray;
   determining a pointer-based coverage area representing a reach of said pointer device based on said pointer vector and a tolerance margin;
   identifying a plurality of target devices, each target device of said plurality of target devices being associated with a respective target position indicator;
   determining whether said target position indicators associated with said multiple target devices of said plurality of target devices fall within said pointer-based coverage area, wherein a pointed-at target device must fall within said pointer-based coverage area of said pointer device;
   determining, within said tolerance margin, said pointer device points at a first target device of a first device type and a second target device of a second device type of said plurality of target devices, based on said pointer-based coverage area, wherein the first device type and the second device type are different;
   identifying a target device action indicator, said target device action indicator being associated with said pointer device and said first target device of said first device type and said second target device of said second device type; and
   determining one or more target device action commands for each of said multiple target devices based on said target device action indicator, said one or more target device action commands causing said first target device of said first device type and said second target device of said second device type to perform a same action.

2. The computer-implemented method of claim 1, wherein said pointer position indicator, said pointer direction indicator, and said target position indicators are defined in a three-dimensional space.

3. The computer-implemented method of claim 1, wherein at least one target position indicator represents a geometric entity selected from the group consisting of:
   a line in a three-dimensional space; and
   a plane in a three-dimensional space.

4. The computer-implemented method of claim 1, further comprising:
   identifying one or more gyroscope data artefacts, said one or more gyroscope data artefacts being associated with said pointer device; and
   wherein said pointer direction indicator is determined based on said one or more gyroscope data artefacts.

5. The computer-implemented method of claim 1, further comprising:
   receiving one or more user position tracking data artefacts from said pointer device; and
   receiving one or more user object identification data artefacts from said pointer device, said one or more user object identification data artefacts being associated with said one or more user position tracking data artefacts; and wherein:
identifying said target device is performed based on said one or more user object identification data artefacts; and
said target position indicator is determined based on said one or more user position tracking data artefacts.

6. A computer program product, the computer program product comprising one or more computer readable storage media and program instructions stored on said one or more computer readable storage media, said program instructions comprising instructions to:
identify a pointer device, said pointer device being associated with a pointer position indicator and a pointer direction indicator;
determine a pointer-based ray based on said pointer position indicator and said pointer direction indicator, said pointer-based ray being associated with said pointer device;
determine a point vector originating at said pointer position indicator in a direction of said pointer direction indicator based on said pointer position indicator, said pointer direction indicator, and a length of said pointer-based ray, the pointer vector having a magnitude of said length of said pointer-based ray;
determine a pointer-based coverage area representing a reach of said pointer device based on said pointer vector and a tolerance margin;
identify a plurality of target devices, each target device of said plurality of target devices being associated with a respective target position indicator;
determine whether said target position indicators associated with said multiple target devices of said plurality of target devices fall within said pointer-based coverage area, wherein a pointed-at target device must fall within said pointer-based coverage area of said pointer device;
determine, within said tolerance margin, said pointer device points at a first target device of a first device type and a second target device of a second device type of said plurality of target devices, based on said pointer-based coverage area, wherein the first device type and the second device type are different;
identify a target device action indicator, said target device action indicator being associated with said pointer device and said first target device of said first device type and said second target device of said second device type; and
determine one or more target device action commands for each of said multiple target devices based on said target device action indicator, said one or more target device action commands causing said first target device of said first device type and said second target device of said second device type to perform a same action.

7. The computer program product of claim 6, wherein said pointer position indicator, said pointer direction indicator, and said target position indicators are defined in a three-dimensional space.

8. The computer program product of claim 6, wherein at least one target position indicator represents a geometric entity selected from the group consisting of:
a line in a three-dimensional space; and
a plane in a three-dimensional space.

9. The computer program product of claim 6, wherein:
said program instructions further comprise instructions to identify one or more gyroscope data artefacts, said one or more gyroscope data artefacts being associated with said pointer device; and said pointer direction indicator is determined based on said one or more gyroscope data artefacts.

10. The computer program product of claim 6, wherein:
said program instructions further comprise instructions to:
receive one or more user position tracking data artefacts from said pointer device; and
receive one or more user object identification data artefacts from said pointer device, said one or more user object identification data artefacts being associated with said one or more user position tracking data artefacts;
said instructions to identify said target device are performed based on said one or more user object identification data artefacts; and
said target position indicator is determined based on said one or more user position tracking data artefacts.

11. A computer system comprising:
a processor;
one or more computer readable storage media;
computer program instructions;
said computer program instructions being stored on said one or more computer readable storage media; and
said computer program instructions comprising instructions to:
identify a pointer device, said pointer device being associated with a pointer position indicator and a pointer direction indicator;
determine a pointer-based ray based on said pointer position indicator and said pointer direction indicator, said pointer-based ray being associated with said pointer device;
determine a point vector originating at said pointer position indicator in a direction of said pointer direction indicator based on said pointer position indicator, said pointer direction indicator, and a length of said pointer-based ray, the pointer vector having a magnitude of said length of said pointer-based ray;
determine a pointer-based coverage area representing a reach of said pointer device based on said pointer vector and a tolerance margin;
identify a plurality of target devices, each target device of said plurality of target devices being associated with a respective target position indicator;
determine whether said target position indicators associated with said multiple target devices of said plurality of target devices fall within said pointer-based coverage area, wherein a pointed-at target device must fall within said pointer-based coverage area of said pointer device;
determine, within said tolerance margin, said pointer device points at a first target device of a first device type and a second target device of a second device type of said plurality of target devices, based on said pointer-based coverage area, wherein the first device type and the second device type are different;
identify a target device action indicator, said target device action indicator being associated with said pointer device and said first target device of said first device type and said second target device of said second device type; and
determine one or more target device action commands for each of said multiple target devices based on said target device action indicator, said one or more target device action commands causing said first target device of said first device type and said second target device of said second device type to perform a same action.

12. The computer system of claim 11, wherein at least one target position indicator represents a geometric entity selected from the group consisting of:
   a line in a three-dimensional space; and
   a plane in a three-dimensional space.

13. The computer system of claim 11, wherein:
   said computer program instructions further comprise instructions to identify one or more gyroscope data artefacts, said one or more gyroscope data artefacts being associated with said pointer device; and
   said pointer direction indicator is determined based on said one or more gyroscope data artefacts.

14. The computer system of claim 11, wherein:
   said computer program instructions further comprise instructions to:
      receive one or more user position tracking data artefacts from said pointer device; and
      receive one or more user object identification data artefacts from said pointer device, said one or more user object identification data artefacts being associated with said one or more user position tracking data artefacts;
   said instructions to identify said target device are performed based on said one or more user object identification data artefacts; and
   said target position indicator is determined based on said one or more user position tracking data artefacts.

* * * * *